(12) United States Patent
Pullmann et al.

(10) Patent No.: US 7,775,072 B2
(45) Date of Patent: Aug. 17, 2010

(54) SAFETY SWITCH FOR A MOVEABLE GUARD DOOR

(75) Inventors: Jürgen Pullmann, Ebersbach (DE); Roland Rupp, Hattenhofen (DE); Andreas Veit, Filderstadt (DE); Peter Eichinger, Winnenden (DE)

(73) Assignee: Pilz GmbH & Co. KG, Ostfildern (DE)

( * ) Notice: Subject to any disclaimer, the term of this patent is extended or adjusted under 35 U.S.C. 154(b) by 719 days.

(21) Appl. No.: 11/604,507

(22) Filed: Nov. 27, 2006

(65) Prior Publication Data
US 2007/0204662 A1 Sep. 6, 2007

(30) Foreign Application Priority Data
Nov. 28, 2005 (DE) .................. 10 2005 057 108

(51) Int. Cl.
*E05B 47/06* (2006.01)
(52) U.S. Cl. .................. 70/208; 70/278.7; 70/279.1; 70/283; 70/432; 292/144; 292/153; 292/177; 292/181; 292/254; 292/335; 292/336.3; 292/DIG. 31
(58) Field of Classification Search .................. 70/277, 70/279.1, 432, 278.7, 283, 208; 292/144, 292/153, 254, 181, 146, 335, 341.16, 150, 292/177, 179, 336.3, DIG. 31; 200/47, 61.62, 200/61.64, 61.67, 61.68, 332–334; 68/12.26, 68/12.01, 12.02
See application file for complete search history.

(56) References Cited

U.S. PATENT DOCUMENTS

| | | | | |
|---|---|---|---|---|
| 419,766 A * | 1/1890 | Glaeser | .................. | 292/341.16 |
| 1,378,447 A * | 5/1921 | Gebhard | .................. | 292/335 |
| 2,162,929 A * | 6/1939 | Armstrong | .................. | 292/335 |
| 2,240,400 A * | 4/1941 | Johnson | .................. | 292/335 |
| 2,786,701 A * | 3/1957 | Povlich | .................. | 292/144 |
| 3,576,119 A * | 4/1971 | Harris | .................. | 70/271 |
| 3,735,613 A * | 5/1973 | Diebel et al. | .................. | 70/208 |
| 3,751,088 A * | 8/1973 | Schlage | .................. | 292/201 |
| 3,765,709 A * | 10/1973 | Van Wyck | .................. | 292/33 |
| 3,824,817 A * | 7/1974 | Orr | .................. | 70/81 |
| 4,021,065 A * | 5/1977 | Geringer | .................. | 292/144 |
| 4,099,752 A * | 7/1978 | Geringer | .................. | 292/144 |
| 4,167,104 A * | 9/1979 | Bond | .................. | 70/208 |
| 4,529,234 A | 7/1985 | Senften | | |

(Continued)

FOREIGN PATENT DOCUMENTS

DE 2 153 256 5/1972

(Continued)

*Primary Examiner*—Lloyd A Gall
(74) *Attorney, Agent, or Firm*—Harness, Dickey & Pierce, P.L.C.

(57) ABSTRACT

There is disclosed a safety switch for generating an enable signal as a function of the position of a moveable guard door. The safety switch comprises a door part and a frame part. The door part has an activator, which can be displaced between a first and a second position. The frame part has a cutout, in which the activator can engage in the second position. A locking element is arranged on the door part in order to lock the activator in the second position. A sensor is designed to detect at least one of the positions of the activator in order to generate the enable signal as a function thereof.

21 Claims, 3 Drawing Sheets

U.S. PATENT DOCUMENTS

| | | | |
|---|---|---|---|
| 4,634,155 A * | 1/1987 | Geringer et al. | 292/144 |
| 4,840,050 A * | 6/1989 | Gotanda | 70/107 |
| 4,902,053 A * | 2/1990 | Hakkarainen et al. | 292/144 |
| 4,904,005 A * | 2/1990 | Frolov | 292/251.5 |
| 5,004,287 A * | 4/1991 | Doyle | 296/57.1 |
| 5,029,912 A | 7/1991 | Gotanda | |
| 5,760,353 A | 6/1998 | Rapp | |
| 5,925,861 A * | 7/1999 | Fromberg | 200/61.67 |
| 6,076,385 A * | 6/2000 | Pedroso et al. | 70/257 |
| 6,318,138 B1 * | 11/2001 | Mathews et al. | 70/278.7 |
| 6,381,999 B1 * | 5/2002 | Doong | 70/107 |
| 6,595,561 B1 * | 7/2003 | Szablewski et al. | 292/304 |
| 6,843,084 B2 * | 1/2005 | Porter | 70/208 |
| 7,040,125 B2 * | 5/2006 | Ciezki et al. | 70/208 |
| 2004/0159134 A1 | 8/2004 | Eichenauer | |
| 2005/0012343 A1 * | 1/2005 | Warden et al. | 292/144 |

FOREIGN PATENT DOCUMENTS

| | | |
|---|---|---|
| DE | 40 15 797 A1 | 12/1990 |
| DE | 40 00 643 A1 | 4/1991 |
| DE | 43 28 297 C1 | 2/1995 |
| DE | 196 24 172 C2 | 1/1998 |
| DE | 203 08 093 U1 | 8/2003 |
| DE | 103 05 704 B3 | 6/2004 |
| EP | 0 136 570 A2 | 4/1985 |
| EP | 0 600 795 A1 | 6/1994 |
| EP | 1 288 401 A1 | 3/2003 |
| WO | WO 85/03970 | 9/1985 |
| WO | WO 97/21893 | 6/1997 |
| WO | WO 00/64054 | 10/2000 |

* cited by examiner

SAFETY SWITCH FOR A MOVEABLE GUARD DOOR

BACKGROUND OF THE INVENTION

The present invention relates to a safety switch for generating an enable signal as a function of the position of a moveable guard door, and more particularly to a safety switch of this kind having a locking element designed to lock the guard door in the closed position.

Safety switches of this kind may also be referred to as interlock devices with guard locking. They are used on guard doors, guard flaps or the like, which are intended to prevent access to an automated machine or system as long as the machine or system is in a hazardous state. The machine may be, for example, a robot, a machine tool having a rapidly rotating spindle, a transportation or conveying system, a press or another machine or system whose operation represents a hazard to people located in the working area of the machine. The safety switches can be used as signaling devices, by means of which a control device can identify the closed state of the guard door. The control device is typically configured to bring the machine into operation only when the guard door is closed. If the guard door is opened during running operation (if possible), the control device needs to bring the machine or system into a nonhazardous state by, for example, switching off the power supply to the machine or system.

There is a large number of machines and systems which represent a hazard for a certain amount of time even after they have been shut down, for example because the machine or system is still running down. For such application cases, safety switches are required which prevent the guard door from being opened until the machine or system has reached its nonhazardous state. This function is here referred to as guard locking.

Conventionally, the prior art safety switches have what is called an activator, which is arranged on the moveable guard door. When the guard door is closed, the activator engages in an activator receptacle on the door frame, which is detected by means of one or more sensors. In the case of a safety switch with guard locking, the activator is also locked in the activator receptacle preventing it from being withdrawn. The activator in this case fulfills two functions, namely firstly that of a detector element, by means of which the closed position of the guard door can be detected, and secondly that of a bolt, which prevents the guard door from being opened as long as the activator is locked in the activator receptacle. The activator can be enabled, for example, via an electromotive actuator, which is activated by the control device as soon as the monitored machine or system has assumed its safe state.

One example of such a safety switch is disclosed by DE 43 28 297 C1. The activator (referred to as a key therein) is a flat metal plate having a central opening, in which a cam can engage in order to realize the guard locking function. The activator receptacle is a narrow channel, whose internal dimensions are only slightly greater than the external dimensions of the activator. The known safety switch therefore has the disadvantage that the guard door and the frame need to be aligned very precisely with respect to one another so that the activator can engage in the activator receptacle. It is thus difficult to install this known safety switch. Problems also result if the guard door drops over the course of time, with the result that the installation tolerances are no longer maintained. In this case, the guard door can no longer be closed properly.

DE 196 24 172 C2 discloses another safety switch, where the activator needs to be inserted into a narrow activator receptacle. This known safety switch also requires tight installation tolerances.

WO 00/64054 describes various embodiments of prior art safety switches, but the mechanical design is only illustrated schematically. A characterizing feature of these known safety switches is the fact that the activator and the activator receptacle each have signal means, which are arranged such that signal interchange is only possible in the case of a locking engagement. The advantage of this implementation consists in the fact that only a single sensor is required in order to meet the safety-related requirements of the relevant European Standard EN 1088. The problems outlined above in connection with tight installation tolerances are not addressed in WO 00/64054.

DE 103 05 704 B3 describes a prior art safety switch which alleges to allow high installation tolerances and dropping of the guard door. The known safety switch has an activator, which can be moved between a first and a second position via a handle. In the second position, the activator protrudes so far out of the door part that it can engage in an activator receptacle on the frame part, thereby locking the guard door. Provided in the frame part is a pivotable locking element, by means of which the activator can be locked in the activator receptacle. Both the activator and the locking element have (in the normal installed position) vertically extending grooves and projections, which match one another and engage in one another in the locked state. Since the grooves and projections extend in the vertical direction, the activator and the locking element can move towards one another in the vertical direction. As a result, this known safety switch offers increased installation tolerance in the vertical direction. In the horizontal direction, the freedom of movement is limited by the depth of the grooves and projections.

SUMMARY OF THE INVENTION

Against this background, it is an object of the present invention to provide for an improved safety switch with a guard locking function.

It is another object to provide for a safety switch with a guard locking function which can be realized in a simple and cost-effective manner.

Yet another object is provide for a safety switch with a guard locking function which allows for high installation tolerances.

Yet another is provide for a safety switch with a guard locking function and an improved resistance against violent manipulation.

According to one aspect of the invention, there is provided a safety switch for generating an enable signal as a function of a position of a moveable guard door moveable relative to mating door piece, the safety switch comprising a door part to be fixed to the moveable guard door and comprising a frame part to be fixed to the mating door piece, the door part having an activator adapted to be displaced between a first and a second position, and the frame part having a cutout adapted to receive the activator in the second position, further comprising a locking element designed to lock the activator in the second position, and comprising a sensor designed to detect at least one of the positions of the activator in order to generate the enable signal as a function thereof, wherein the locking element is arranged on the door part.

According to another aspect, there is provided a safety switch for generating an enable signal as a function of a position of a guard door moveable relative to mating door piece, the safety switch comprising a door part to be fixed to the moveable guard door and comprising a frame part to be fixed to the mating door piece, the door part having an activator adapted to be displaced between a first and a second position, and the frame part having a cutout adapted to receive the activator in the second position, further comprising a locking element designed to lock the activator in the second position, and comprising a sensor designed to detect at least one of the positions of the activator in order to generate the enable signal as a function thereof, wherein the door part has a handle adapted to be moved between an extended position in which it can be gripped and a retracted position in which it cannot be gripped, with the handle being coupled to the activator such that the handle is located in the retracted position when the activator is in the second position.

The present invention for the first time follows the approach of realizing the function of the guard locking in the moveable door part. In contrast to this, the locking elements in the case of all known safety switches are arranged in or on the frame part (which is generally fixed). This conventional design makes it necessary to design the free end of the activator, which enters the activator receptacle, such that it can be locked in the activator receptacle. Grooves, projections, cutouts, openings or the like in which a locking element of the frame part engages are therefore always required at the free end of the activator. Safe and reliable operation in these cases is only ensured if the locking element and the free end of the activator engage in one another with sufficient fitting accuracy. The fitting accuracy determines and limits the installation tolerances. In contrast to this, the present invention makes it possible to design the free end of the activator "as desired", and it can be inserted into the activator receptacle with very large tolerances because the latching takes place at another point on the activator, namely in the door part. It is sufficient if the free end of the activator enters a type of lock pocket on the frame part, with the result that the guard door is prevented from being opened transversely with respect to the movement direction of the activator. Latching of the activator in the lock pocket takes place "from behind", however, for which reason the activator can be accommodated in the lock pocket with large tolerances. The novel concept provides for large installation tolerances both in the vertical and in the horizontal direction. Furthermore, the novel concept can be realized in a very simple and cost-effective manner, as will be illustrated below with reference to preferred embodiments.

In a refinement, the activator has a free end which is designed substantially mirror-symmetrical in the vertical.

Preferably, the free end of the activator is mirror-symmetrical both in the vertical and in the horizontal. In one embodiment, the free end of the activator is rectangular in cross section, which is possible because the free end is no longer required for locking the activator in the frame part. The refinement has the advantage that the novel safety switch can be used with little complexity in various installation positions, for example with the door stop on the right or with the door stop on the left. As a result, the number of parts for the novel safety switch can be reduced. The novel safety switch can be realized in an even more cost-effective manner.

In a further refinement, the sensor is designed to detect the second position of the activator in a failsafe manner.

"Failsafe" in this case means that the sensor can detect the second position of the activator only when the activator is actually located in the second position. It is particularly preferred if the sensor is arranged on the frame part, in particular in the region of the cutout. In this case, a single sensor is sufficient for detecting the latched position of the guard door in a reliable manner, which can lead to the monitored machine or system being enabled. The arrangement of the sensor in the region of the cutout is particularly preferred because it allows a compact implementation with a high degree of failsafety.

In a further preferred refinement, the sensor is designed for reading an ID tag, in particular for reading what is known as a transponder, and the activator contains an ID tag arranged such that it can be read in one of the two positions by the sensor. The ID tag is preferably arranged such that it can only be read precisely in the second position of the activator. This can be realized, for example, by using a transponder as the ID tag, which transponder is arranged in a recess at the free end of the activator. As a result, a small switching distance is achieved which ensures that the sensor only responds when the activator with the ID tag is inserted into the cutout. These preferred refinements allow for a particularly simple and cost-effective implementation, which at the same time provides a high degree of failsafety.

In a further refinement, the activator has a front side positioned substantially transversely with respect to the direction of movement of the activator, with the ID tag being arranged at the free front side. Preferably, the ID tag is mounted on the front side in a retracted manner. The sensor preferably sits on the base of the cutout, i.e. opposite the free end of the entering activator.

These refinements represent a particularly simple possibility for achieving failsafe evaluation in various installation positions of the novel safety switch. The ID tag is in this case pushed forward into the cutout parallel to the axis of movement of the activator, which allows for very reliable detection in the activator receptacle irrespective of the installation position.

In a further refinement, the door part has a first spring for prestressing the activator into the first position.

This refinement has the advantage that the activator is moved automatically into the "unsafe" first position if the locking element fails in terms of its function. Since enabling of the machine or system depends on the position of the activator, a functional fault in the important locking element is recognized in this manner simply and rapidly. Furthermore, the prestress of the activator by means of a spring has the advantage that the door part can be implemented without an electrical power supply, which further simplifies fitting of the novel safety switch.

In a further refinement, the locking element can be displaced between a third and a fourth position, and the door part has a second spring for prestressing the locking element in the third position, the third position being designed to lock the activator tor in the second position.

This refinement prestresses the locking element—again without any additional electrical energy from the outside—in the "safe" position. The locking element therefore automatically locks the activator as soon as locking is possible at all. This refinement is a particularly simple and reliable realization.

In a further refinement, the frame part has an actuator (preferably electrically driven such as a lifting magnet) which is designed to move the locking element into the fourth position counter to the second spring.

The arrangement of the actuator in the frame part likewise contributes to the fact that the door part manages without any electrical supply lines and is accordingly simple to fit. The use of a lifting magnet or a similar translatory actuator has proven to be a particularly efficient solution in order to release the locking element, since the release in this refinement needs to take place via the door gap between the frame part and the door part.

In a further refinement, the novel safety switch comprises a pulse generator, by means of which drive energy can be applied to the actuator for a short period of time. Advantageously, the pulse generator provides a current pulse. It is furthermore preferred, if the pulse generator can be activated manually.

The above-described use of a first spring for prestressing the activator in the first position allows to realize the release of the novel safety switch with a short pulse. This refinement has the advantage that the actuator does not need to have a current flowing through it when the guard door is open. In contrast to this, the prior art safety switches are designed such that they require a permanent current flow when the guard door is open. The use of a manually activated pulse generator furthermore has the advantage that the guard door, once it has been released, has to be deliberately opened, but without a too high amount of force to be applied for this purpose. The advantage is particularly noticeable in the case of systems covering a wide area and having a plurality of guard doors, since the numerous guard doors do not open as early as when they are released by the control device but only after deliberate manual activation. The guard doors are thereby prevented from unnecessarily springing open, in which case they would have to be closed again manually.

In a further refinement, the door part has an actuating element, which can be moved between a fifth and a sixth position, with the actuator moving the actuating element into the fifth position in order to move the locking element into the fourth position counter to the second spring.

In this refinement, the actuating element, which transfers a movement of the frame-side actuator to the door part, is part of the door part. This refinement allows for a compact design since the locking element can be formed independently of the actuator.

In a further refinement, the actuating element can be moved along an axis of movement, which runs approximately parallel to the direction of movement of the activator.

This refinement allows for a very efficient force transfer, with the result that the locking element can be released with a low amount of energy being consumed. In addition, the installation tolerances can be maximized independ of the release of the locking element.

In a further refinement, the actuating element is arranged within the activator.

This refinement results in a particularly compact and efficient realization of the novel safety switch.

In a further refinement, the novel safety switch comprises a third spring for prestressing the actuating element in the sixth position.

This refinement ensures that the actuating element is always located in a defined position, and again without any electrical energy being supplied. As a result, this refinement contributes to a simple and reliable design of the novel safety switch.

In a further refinement, the door part has a handle, which can be moved between an extended position in which it can be gripped and a retracted position, with the handle being coupled to the activator such that the handle is located in the retracted position when the activator is in the second position.

This refinement has the advantage that the guard door, once it has been released, can be opened and closed again in a very simple manner. Furthermore, the retractable handle also acts as a visual indicator, which indicates safe closure of the guard door, and it makes violent manipulation of the guard door more difficult.

In a further refinement, the novel safety switch comprises an emergency stop pushbutton and/or an acknowledge pushbutton.

The integration of an emergency stop pushbutton and/or an acknowledge pushbutton in the novel safety switch contributes to a further reduction in the installation complexity. An emergency stop pushbutton serves the purpose of bringing a monitored machine or system in a hazardous situation rapidly into a safe state manually. The integration of such a pushbutton in the novel safety switch is particularly advantageous since the safety switch does not allow for emergency shutdown of the machine or system by itself owing to the guard locking function. The integration of an acknowledge pushbutton makes it possible to manually acknowledge closure of a guard door, which can be used in an advantageous manner for bringing the machine or system into operation again.

It goes without saying that the abovementioned features and those which are yet to be explained below can be used not only in the respectively given combination but also in other combinations or on their own, without leaving the scope of the present invention.

BRIEF DESCRIPTION OF THE DRAWINGS

Exemplary embodiments of the invention are illustrated in the drawing and will be explained in more detail in the description below. In the drawing.

DESCRIPTION OF PREFERRED EMBODIMENTS

Figure 1:
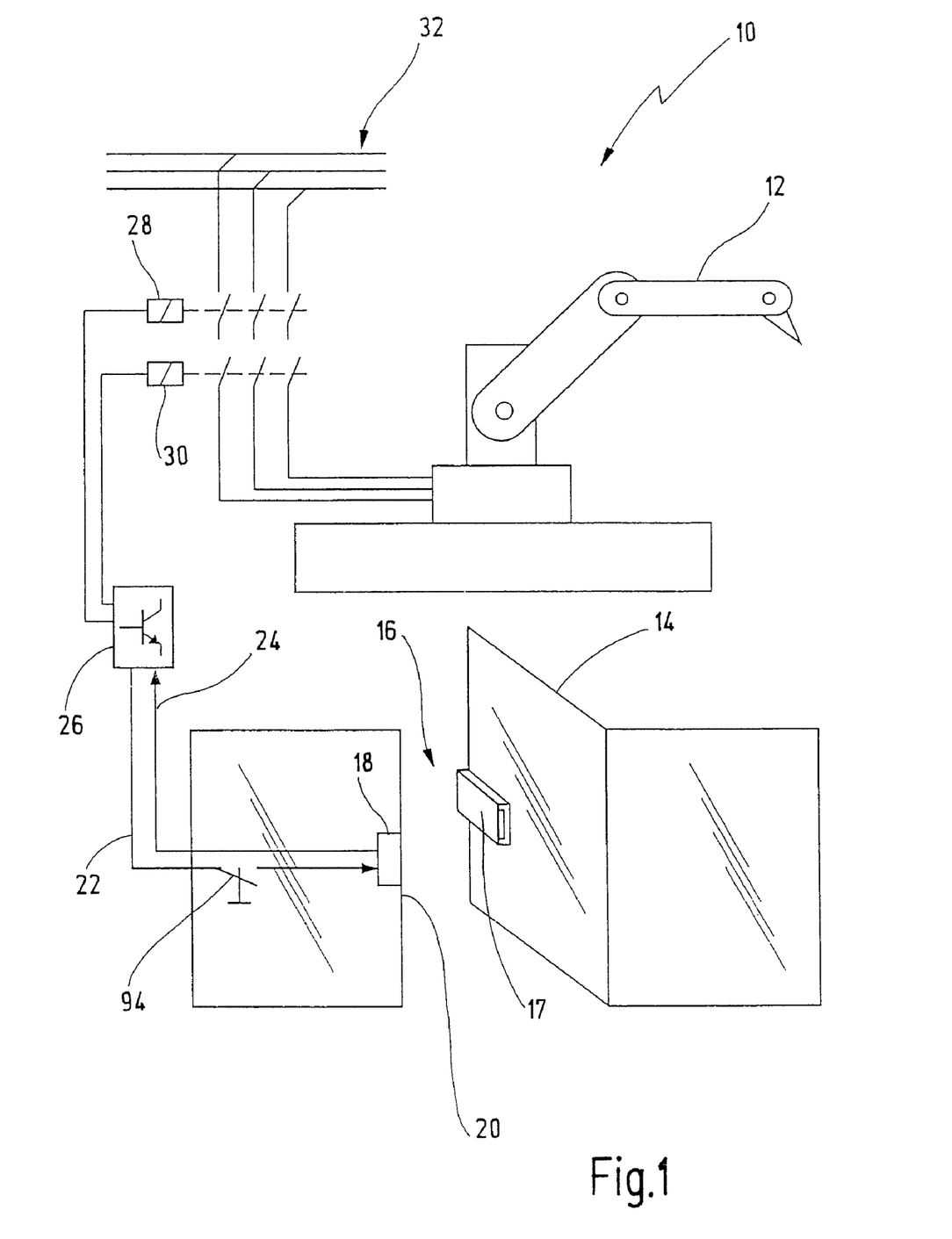
FIG. 1 shows a schematic illustration of an apparatus having a safety switch according to the invention.

In FIG. 1, an apparatus having the novel safety switch is denoted in its entirety by the reference numeral 10. The apparatus 10 in this case contains a robot 12, whose working area is secured by means of a guard door 14. A safety switch 16 in accordance with the present invention is arranged on the guard door 14. The safety switch 16 contains a door part 17, which is fixed to the moveable guard door 14, and a frame part 18, which rests on a mating door piece 20. In the embodiment illustrated, the mating door piece 20 is a stationary stop for the guard door 14. In the other embodiments, the mating door piece 20 may be a second door leaf of a two-part guard door.

The frame part 18 is connected to a safety switching device 26 via two lines 22, 24. The safety switching device 26 is, for example, a safety switching device from the PNOZ® series, which is marketed by the Applicant of the present invention. These safety switching devices are multi-channel-redundant safety switching devices which are designed to evaluate the output signals of signaling devices, such as the safety switch 16, and shut down an electrical load as a function thereof. The electrical load is in this case the robot 12. Accordingly, the safety switching device 26 drives two contactors 28, 30, whose make contacts are arranged in the connection between a power supply 32 and the robot 12. As an alternative to the safety switching device 26, the safety switch 16 could also be connected to a programmable safety controller, as is marketed by the Applicant of the present invention under the brand name PSS®.

A preferred embodiment of the novel safety switch 16 will be described in the following, Same reference symbols denote the same elements as above.

Figure 2:
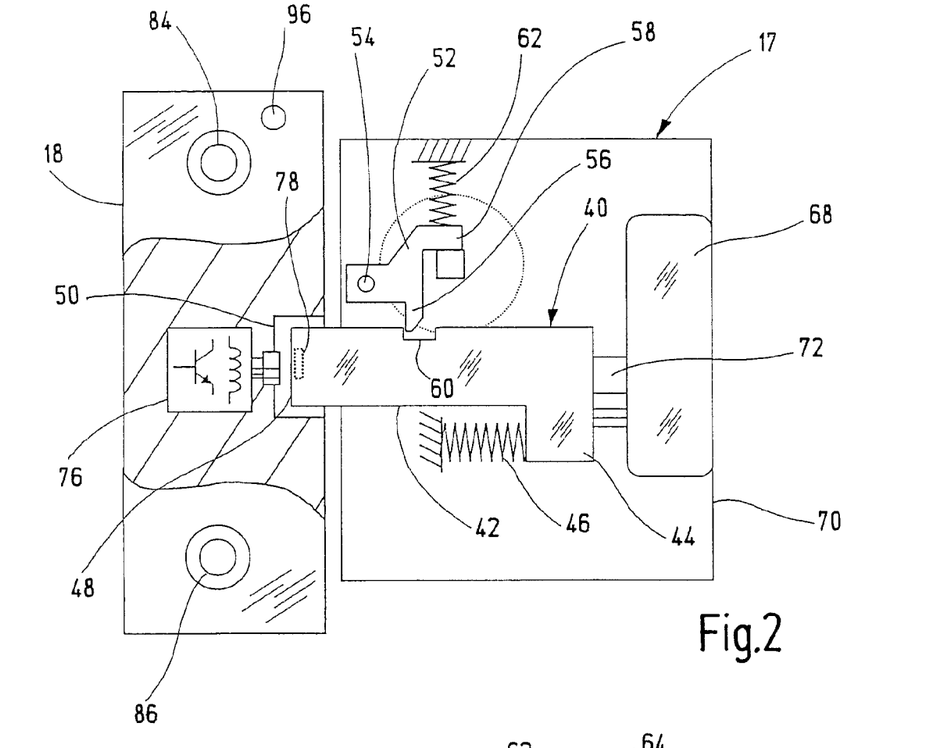
FIG. 2 shows an exemplary embodiment of the safety switch shown in FIG. 1 in a partially sectioned, schematic illustration.
Figure 3:
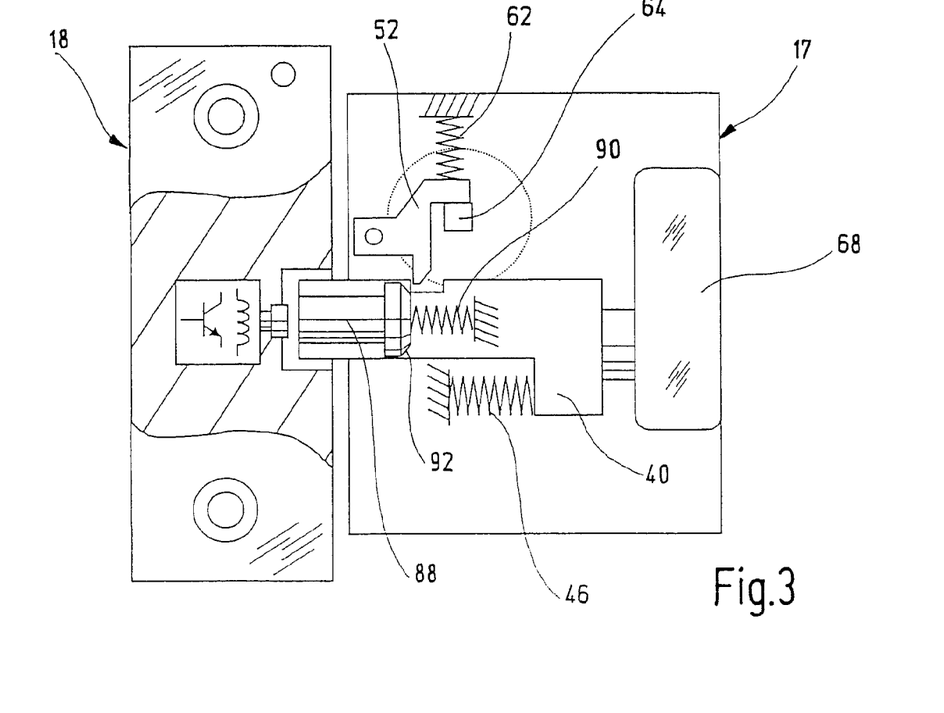
FIG. 3 shows the safety switch shown in FIG. 2 with further details.
Figure 4:
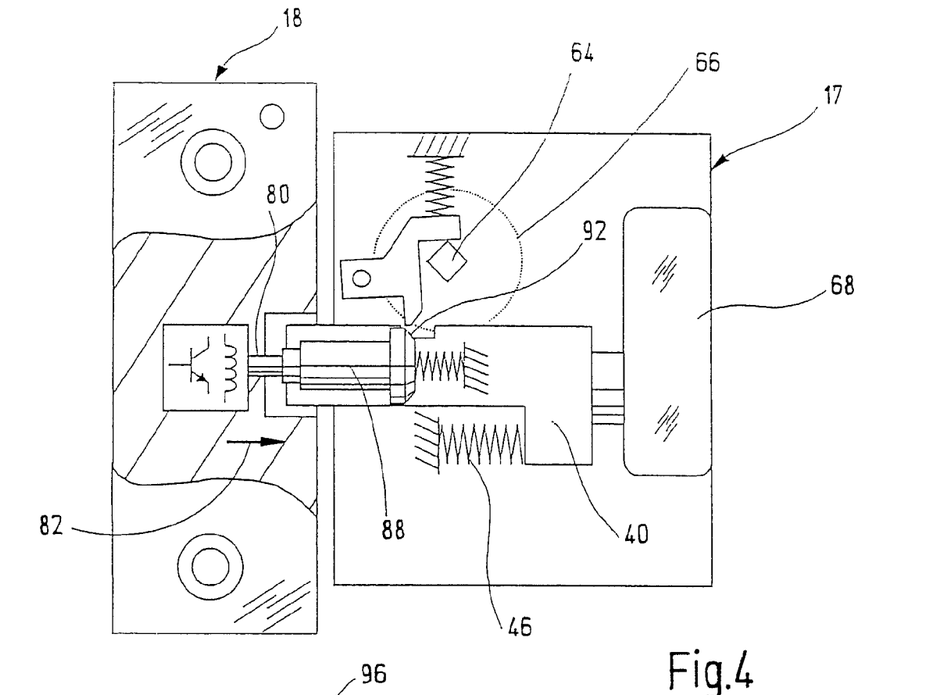
FIG. 4 shows the safety switch shown in FIG. 3 when the guard locking is opened.

As illustrated in FIG. 2, the door part 17 of the novel safety switch 16 contains an activator 40, which can be moved between a first position (illustrated in FIG. 5) and a second position (illustrated in FIGS. 2 to 4). The activator is in this case in the form of an L and has a long limb 42 and a short limb 44. A (first) spring 46, which prestresses the activator 40 into the first position (FIG. 5), acts on the short limb 44. In the second position (FIG. 2), the free end 48 of the long limb 42 protrudes laterally over the door part 17, with the result that it can engage in a cutout 50, which is formed in the frame part 18. The cutout 50 is substantially rectangular in this preferred embodiment, the clear internal dimensions (not designated here) in all directions being approximately 5 mm greater than the external dimensions at the free end 48 of the activator 40.

The reference numeral 52 denotes a locking element, which locks the activator 40 in the second position counter to the prestressing force of the spring 46. The locking element 52 is in this case in the form of a toggle lever, which can be pivoted about an axis 54. The toggle lever 52 has two free ends 56, 58, which run out approximately at right angles with respect to one another. In the operating position illustrated in FIG. 2, the free end 56 of the toggle lever 52 engages in an opening 60, which is formed in the upper longitudinal side of the activator 40. As a result, the activator 40 is held in the second position counter to the prestress of the spring 46. A second spring 62, which prestresses the toggle lever 52 into the locking position illustrated in FIG. 2, acts on the free end 58. In addition, the free end 58 rests on a square rotary spindle 64 (FIGS. 3 and 4), which can be rotated, via a handwheel 66 through 45° (FIG. 4). In the position rotated through 45°, the rotary spindle 64 moves the toggle lever 52 upwards counter to the prestressing force of the spring 62, with the result that the free end 56 releases the activator 40. The handwheel 66 (only indicated schematically) is optional and is accessible from the inside of the guard door 14 in order to be able to open the guard door 14 by hand when the guard locking is activated (emergency unlatching). The handwheel 66 is preferably arranged such that it is not accessible from the outside of the guard door 14. In addition, the rotary spindle 64 may be accessible from the outside of the guard door 14, in order to allow an emergency release even from the outside. In this case, the rotary spindle is advantageously arranged behind a cover (not shown here), which can be opened only after breaking a seal.

Figure 5:
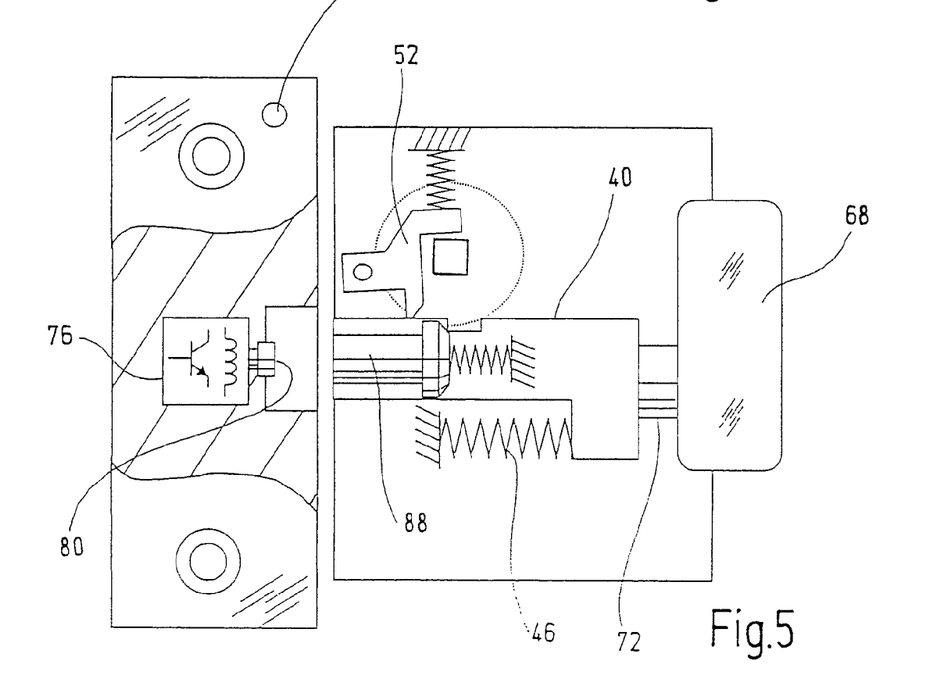
FIG. 5 shows the safety switch shown in FIG. 3 with the guard locking open.

Reference numeral 68 denotes a handle, which is arranged, retracted, in the housing 70 of the door part 17. The handle 68 is connected to the activator 40 via a bolt 72. This design makes it possible for the handle 68 to follow a movement of the activator 40. In the operating position illustrated in FIG. 2, the handle 68 is retracted, flush, in the housing 70 of the door part 17 (FIG. 2). If the activator 40 is located in its first, pushed-back position, the handle 68 is pushed out of the housing 70 (FIG. 5). In this position, the handle 68 can be gripped in order to close the guard door 14 and then to move the activator 40 into the second position counter to the prestressing force of the spring 46. In this case, the outwardly protruding handle 68 (FIG. 5) indicates that the activator 40 is located in the first position, i.e. the guard door 14 is not locked.

Reference numeral 76 denotes a sensor and actuator circuit, which is arranged in the frame part 18 in the region of the cutout 50. The sensor/actuator circuit 76 is designed on the one hand to read a transponder 78, which is arranged on the front side of the free end 48 of the activator 40. The transponder 78 is in this case arranged on the front side of the activator 40 such that it can only be read by the sensor/actuator circuit 76 if the free end 48 of the activator 40 protrudes sufficiently far into the cutout 50. The activator 40 is locked in this position by locking element 52. Furthermore, the sensor/actuator circuit 76 is designed to advance a plunger 80 arranged in the region of the cutout 50 (FIG. 4) in the direction of the arrow 82. The function of the plunger 80 will be explained below with reference to FIGS. 3 and 4.

Finally, an emergency stop pushbutton is illustrated schematically at reference numeral 84, and an acknowledge pushbutton is illustrated schematically at reference numeral 86. The emergency stop pushbutton 84 serves the purpose of triggering an emergency stop of the robot 12 by hand. For this purpose, the emergency stop pushbutton 84 is monitored in a manner known per se by the safety switching device 26. The acknowledge pushbutton 86 serves the purpose of confirming that the guard door 14 has been closed, including that the activator 40 has been advanced. The output signal of the acknowledge pushbutton 86 can be input to the safety switching device 26 in order to allow to start up the robot 12 again as a function thereof.

As is illustrated in FIG. 3, the first limb 42 of the activator 40 has a hollow design in the preferred embodiment. An actuating element in the form of a slide 88 is arranged in the interior of the hollow limb 42. The slide 88 is prestressed via a third spring 90 against the free end 48 of the activator 40. On its side facing away from the free end 48 of the activator 40, the slide 88 has a bevel 92, which is designed to lift the free end 56 of the toggle lever 52 up in order to bring the toggle lever 52 into the elevated position illustrated in FIG. 4. The slide 88 therefore acts as an actuating element, by means of which the latching of the activator 40 can be released as an alternative to the emergency release by means of the handwheel 66 and the rotary spindle 64, respectively.

The manner in which the novel safety switch 16 functions is therefore as follows: in the closed and latched state, the free end 48 of the activator 40 engages in the cutout 50 in the frame part 18. The slide 88 is prestressed towards the free end 48 via the spring 90. The end 56 of the toggle lever 52 protrudes into the opening 60 in the activator 40 and therefore locks the activator 40 counter to the prestressing force of the spring 46. In this state, the guard door 14 is latched and locked. The toggle lever 52 provides for a guard locking function, which can only be released by a deliberate release operation. The closed state of the guard door is detected by the sensor/actuator circuit 76 by means of the transponder 78 and signaled to the safety switching device 26. The safety switching device 26 enables operation of the robot 12 owing to the closed guard door 14 by closing the make contacts of the contactors 28, 30.

If a person now wants to enter the working area of the robot 12, the robot 12 first needs to be brought into a safe operating position, for example be shut down. The safe operating position is detected by means of sensors (not illustrated here). Alternatively, a timing element may be provided, which is triggered by the robot 12 being shut down. Once a period of time fixed by the timing element (not illustrated here) has elapsed, a safe rest position of the robot 12 is assumed. In order now to open the guard door, the activator 40 first needs to be unlocked. This takes place by the safety switching device 26 transmitting a release signal to the sensor/actuator circuit 76. The sensor/actuator circuit 76 thereupon activates the plunger 80 in the direction of the arrow 82 (FIG. 4). Owing to the plunger 80 being advanced, the slide 88 is likewise advanced in the direction of the arrow 82 (counter to the spring 90). Owing to the bevel 92, the toggle lever 52 is lifted up counter to the force of the spring 62. The spring 46 now ensures that the activator 40 is pushed back along its axis of movement (in the direction of the arrow 82). In addition, the handle 68 is extended owing to the activator 40 moving back. It is now possible to open the guard door 14 (FIG. 5).

In order to prevent the guard door 14 from springing open in an undesirable manner the release signal from the safety switching device 26 is present, the release signal can be passed from the safety switching device 26 via a pushbutton 94 (FIG. 1), which needs to be activated manually in order to actually release the guard door 14. In a particularly advantageous manner, the pushbutton 94 may be in the form of a pulse generator since only a short energy pulse is required for unlatching the guard door 14, which energy pulse is sufficient for advancing the plunger 80 to such an extent that the slide 88 lifts the toggle lever 52 up in the described manner. Owing to the purely mechanical design of the door part 17, a continuous current is not required for unlatching the guard door 14.

In order to close it, the guard door 14 can be pulled using the extended handle 68. Owing to the handle 68 being pushed in, the activator 40 is again advanced into the cutout 50. As soon as the free end 56 of the toggle lever 52 engages in the opening 60, the activator 40 is locked again. The closed state of the guard door is then detected by means of the transponder 78 and signaled to the safety switching device 26.

An optical indicator, for example an LED, is illustrated schematically at reference numeral 96, which optical indicator, in addition to or as an alternative to the retractable handle 68, signals the position of the activator 40. In the position shown in FIG. 5, the optical indicator 96 is green, for example, while it is red in the locked position in FIG. 2.

In the embodiment shown, all springs 46, 62, 90 are designed as compression springs, which is advantageous because compression springs provide a higher functional reliability compared to tension springs. A compression spring can hold a certain spring tension even in the case of a cracked spring, whereas a tension spring always fails in the case of a cracked spring.

What is claimed is:

1. A safety switch for generating an enable signal as a function of a position of a moveable guard door moveable relative to a mating door piece, the safety switch comprising a door part to be fixed to the moveable guard door and a frame part to be fixed to the mating door piece, the door part having an activator adapted to be displaced between a first and a second position, and the frame part having a cutout adapted to receive the activator in the second position, further comprising a locking element moveable between a third position and a fourth position and spring biased toward said third position, said locking element being responsive to movement of said activator into the second position to automatically move into said third position and lock the activator in the second position, and a sensor designed to detect at least one of the positions of the activator in order to generate the enable signal as a function thereof, wherein the locking element is arranged on the door part, wherein the door part has a handle adapted to be moved between an extended position in which it can be gripped and a retracted position in which it cannot be gripped, with the handle being integrally connected to the activator to enable a user to move the activator from the first to the second position, such that the handle is only located in the retracted position when the activator is in the second position, and is only located in the extended position when the activator is in the first position.

2. The safety switch of claim 1, wherein the activator has a free end, which is substantially mirror-symmetrical about a vertical plane.

3. The safety switch of claim 1, wherein the sensor is designed to detect the second position of the activator in a failsafe manner.

4. The safety switch of claim 1, wherein the sensor is arranged on the frame part.

5. The safety switch of claim 4, wherein the sensor is arranged in the region of the cutout.

6. The safety switch of claim 1, wherein the door part comprises an ID tag and the sensor is designed for reading the ID tag, wherein the ID tag is arranged on the door part such that it can be read in only one of the two positions by the sensor.

7. The safety switch of claim 6, wherein the activator has a front side positioned facing the frame part, with the ID tag being arranged at the front side.

8. The safety switch of claim 1, wherein the door part has a first spring for prestressing the activator into the first position.

9. The safety switch of claim 8, wherein the first spring is a compression spring.

10. The safety switch of claim 1, wherein the door part has a second spring for prestressing the locking element in the third position, with the third position being designed to lock the activator in the second position.

11. The safety switch of claim 10, wherein the second spring is a compression spring.

12. The safety switch of claim 1, further comprising an emergency stop pushbutton.

13. The safety switch of claim 1, further comprising an acknowledge pushbutton.

14. A safety switch for generating an enable signal as a function of a position of a moveable guard door moveable relative to a mating door piece, the safety switch comprising a door part to be fixed to the moveable guard door and a frame part to be fixed to the mating door piece, the door part having an activator adapted to be displaced between a first and a second position, and the frame part having a cutout adapted to receive the activator in the, second position, further comprising a locking element moveable between a third and a fourth position to lock the activator in the second position, and a sensor designed to detect at least one of the positions of the activator in order to generate the enable signal as a function thereof, wherein the locking element is arranged on the door part and the door part has a first spring for prestressing the locking element in the third position, with the third position being designed to lock the activator in the second position, and further wherein the frame part has an actuator for moving the locking element into the fourth position counter to the first spring.

15. The safety switch of claim 14, further comprising a pulse generator for supplying drive energy to the actuator for a short period of time.

16. The safety switch of claim 14, wherein the door part has an actuating element moveable between a fifth and a sixth position, with the actuator moving the actuating element into the fifth position in order to move the locking element into the fourth position counter to the first spring.

17. The safety switch of claim 16, wherein the actuating element is adapted to move in a direction of movement, which runs substantially parallel to the direction of movement of the activator.

18. The safety switch of claim 16, wherein the actuating element is arranged within the activator.

19. The safety switch of claim 16, further comprising a second spring for prestressing the actuating element in the sixth position.

20. A safety switch for generating an enable signal as a function of a position of a guard door moveable relative to a mating door piece, the safety switch comprising a door part to be fixed to the moveable guard door and a frame part to be fixed to the mating door piece, the door part having an activator adapted to be displaced between a first and a second position, and the frame part having a cutout adapted to receive the activator in the second position, further comprising a locking element designed to lock the activator in the second position, and a sensor designed to detect at least one of the positions of the activator in order to generate the enable signal as a function thereof, wherein the door part has a handle adapted to be moved between an extended position in which it can be gripped and a retracted position in which it cannot be gripped, with the handle being integrally connected to the activator to enable a user to move the activator from the first to the second position, such that the handle is only located in the retracted position when the activator is in the second position and is only located in the extended position when the activator is in the first position.

21. The safety switch of claim 20, wherein the door part has a first spring for prestressing the activator into the first position and the handle into the extended position.

* * * * *